US012674392B2

(12) United States Patent
Roach et al.

(10) Patent No.: US 12,674,392 B2
(45) Date of Patent: Jul. 7, 2026

(54) CMC AIRFOIL WITH COOLING PASSAGE HAVING MULTI-DIMENSIONAL PLENUM

(71) Applicant: RTX CORPORATION, Farmington, CT (US)

(72) Inventors: James T. Roach, Vernon, CT (US); Jonas Banhos, West Hartford, CT (US); Russell Kim, Temecula, CA (US); Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 278 days.

(21) Appl. No.: 18/480,698

(22) Filed: Oct. 4, 2023

(65) Prior Publication Data

US 2025/0116193 A1 Apr. 10, 2025

(51) Int. Cl.
*F01D 5/02* (2006.01)

(52) U.S. Cl.
CPC ........ *F01D 5/02* (2013.01); *F05D 2300/6033* (2013.01)

(58) Field of Classification Search
CPC ....... F05D 2300/6033; F05D 2240/304; F05D 2240/122; F01D 5/185; F01D 5/186; F01D 5/189; F01D 5/188; F01D 5/02; F01D 5/284; F01D 5/282
See application file for complete search history.

(56) References Cited

U.S. PATENT DOCUMENTS

| | | | | |
|---|---|---|---|---|
| 6,099,252 | A * | 8/2000 | Manning | F01D 5/187 416/97 R |
| 7,255,535 | B2 | 8/2007 | Albrecht et al. | |
| 7,785,071 | B1 * | 8/2010 | Liang | F01D 5/187 416/97 R |
| 10,415,397 | B2 | 9/2019 | Gallier | |
| 11,598,216 | B2 | 3/2023 | Gallier et al. | |
| 2017/0328217 | A1 * | 11/2017 | Gallier | F01D 5/288 |

* cited by examiner

*Primary Examiner* — Rodolphe Andre Chabreyrie
(74) *Attorney, Agent, or Firm* — Carlson, Gaskey & Olds, P.C.

(57) ABSTRACT

A CMC airfoil includes core fiber plies that define a radial tube that circumscribes an internal cavity, and skin fiber plies that define an exterior of the airfoil section. There is a filler element in the trailing edge region aft of the internal cavity and sandwiched between the skin fiber plies on the pressure side and the skin fiber plies on the suction side. At least one cooling passage includes at least one inlet orifice section that opens to the internal cavity and extends through the core fiber plies, a radially-elongated multi-dimensional plenum connected with the at least one inlet orifice section, a plurality of outlet orifice sections extending through the trailing edge, and a plurality of intermediate passage sections bound by at least one of the skin plies and the filler element and connecting the radially-elongated multi-dimensional plenum with the plurality of outlet orifice sections.

12 Claims, 6 Drawing Sheets

CMC AIRFOIL WITH COOLING PASSAGE HAVING MULTI-DIMENSIONAL PLENUM

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature core gas flow. The high-pressure and temperature core gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section that defines pressure and suction sides, a leading edge, and a trailing edge region including a trailing edge. The airfoil section is formed of a ceramic matrix composite that includes fiber plies disposed in a ceramic matrix. The fiber plies have core fiber plies that define a radial tube that circumscribes an internal cavity, and skin fiber plies that define an exterior of the airfoil section and wrap around the core fiber plies from the pressure side of the trailing edge region, through the leading edge, and to the suction side of the trailing edge region. There is a filler element in the trailing edge region aft of the internal cavity that is sandwiched between the skin fiber plies on the pressure side and the skin fiber plies on the suction side and at least one cooling passage has at least one inlet orifice section that opens to the internal cavity and extends through the core fiber plies. A radially-elongated multi-dimensional plenum is connected with the at least one inlet orifice section. A plurality of outlet orifice sections extend through the trailing edge, and a plurality of intermediate passage sections are bound by at least one of the skin plies and the filler element and connect the radially-elongated multi-dimensional plenum with the plurality of outlet orifices.

In a further embodiment of any of the foregoing embodiments, the radially elongated multi-dimensional plenum has a serpentine shape.

In a further embodiment of any of the foregoing embodiments, the serpentine shape is provided by a first row of radially-spaced channel segments in one of the core fiber plies and a second row of radially-spaced channel segments in one of the skin fiber plies that is radially offset from the first row such that each one of the radially-spaced channel segments of the second row partially overlaps two of the radially-spaced channel segments of the first row.

In a further embodiment of any of the foregoing embodiments, each of the intermediate passage sections is of an equivalent constant cross-sectional area.

In a further embodiment of any of the foregoing embodiments, the intermediate passage sections are of non-equivalent constant cross-sectional areas.

In a further embodiment of any of the foregoing embodiments, each of the intermediate passage sections is divergent.

The airfoil as recited in claim 1, further including branch passage sections that interconnect the intermediate passage sections.

In a further embodiment of any of the foregoing embodiments, the intermediate passage sections are radially curved.

In a further embodiment of any of the foregoing embodiments, the radial tube has a radiused end in the trailing edge region, and the at least one inlet orifice section opens to the internal cavity at a location forward of the radiused end.

A gas turbine engine according to an example of the present disclosure includes a compressor section, a combustor in fluid communication with the compressor section, and a turbine section in fluid communication with the combustor. The turbine section has airfoils according to any of the foregoing embodiments.

A method of fabricating an airfoil according to any of the foregoing embodiments includes laying-up first core fiber plies to form a radial tube that circumscribes an internal cavity, partially densifying the first core fiber plies with ceramic matrix material, and laying-up an additional core fiber ply around the partially densified first core fiber plies to form a core preform. The additional core fiber ply include pre-formed slots. A filler element is arranged aft of the internal cavity of the core preform, a first skin fiber ply is laid-up around the core preform and the filer element to form a first intermediate preform, and the first intermediate preform is at least partially densified with additional ceramic matrix material. In the at least partially densified first skin fiber ply, intermediate passage section are formed, wherein the intermediate passage sections partially overlap with the preformed slots to provide a radially-elongated multi-dimensional plenum. At least one inlet orifice section is formed through the core preform to the internal cavity to provide a second intermediate preform, and one or more additional skin fiber plies are laid-up around the second intermediate preform to form a final preform. The final preform is then densified with additional ceramic matrix material, and a plurality of outlet orifice sections are formed that extend through the trailing edge. The at least one inlet orifice section, the a radially-elongated multi-dimensional plenum, the intermediate passage sections, and the plurality of outlet orifice sections are connected to provide at least one cooling passage.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
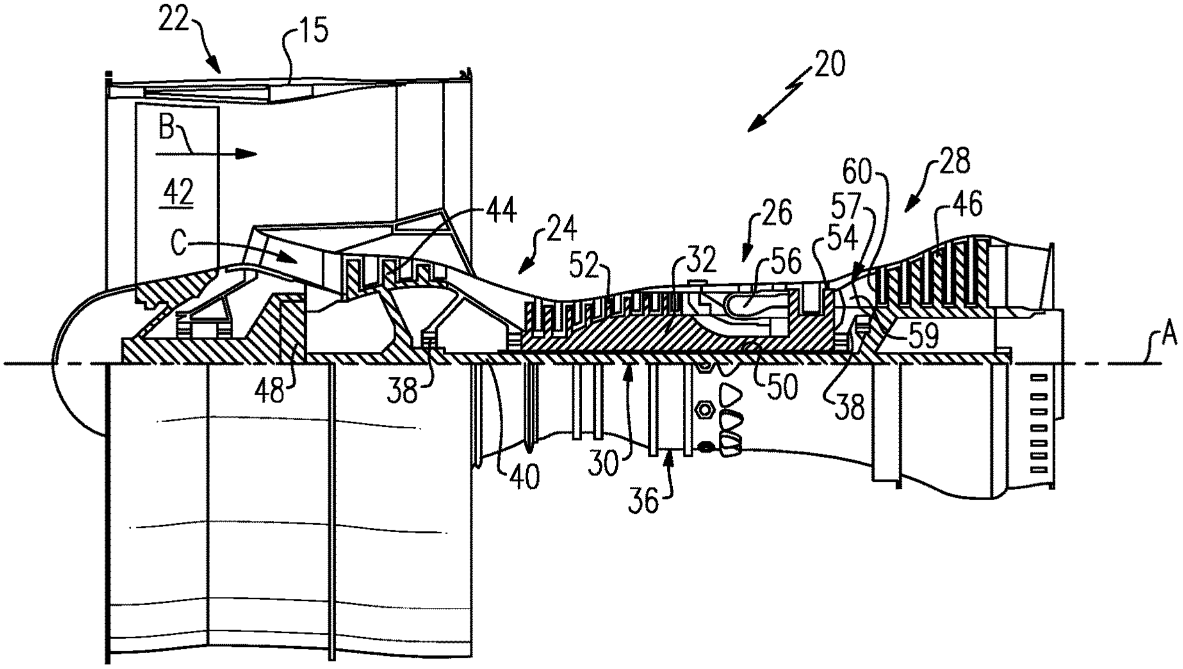
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram}° \text{R})/(518.7° \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
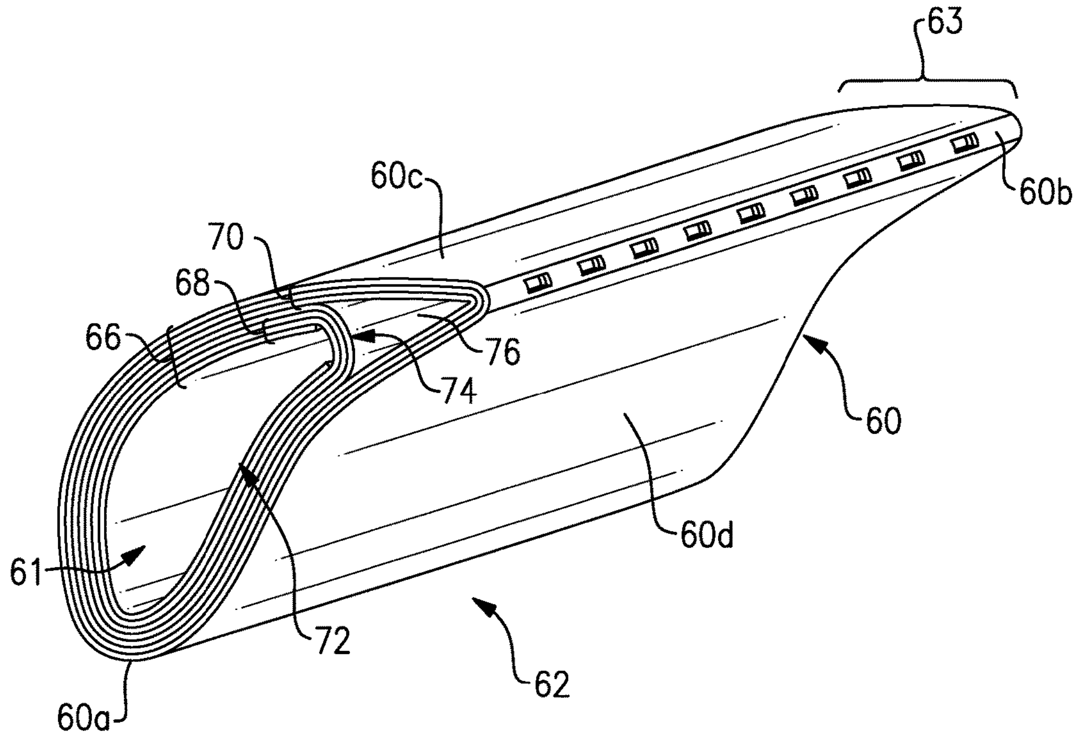
FIG. 2A illustrates an airfoil section.
Figure 2B:
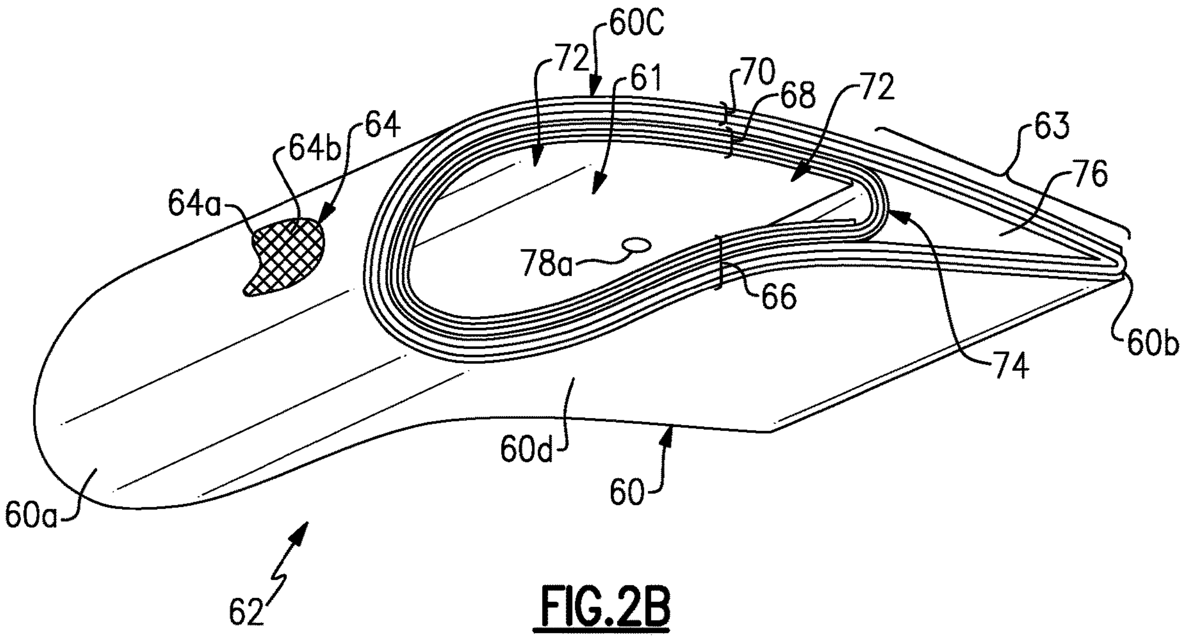
FIG. 2B illustrates the airfoil section from a different perspective.

FIG. 2A (view from aft-looking-forward) and FIG. 2B (view from forward-looking-aft) illustrate sectioned views of an airfoil section 60 through a mid-span region of an airfoil 62. For example, the airfoil 62 is a turbine vane from the turbine section 28 of the engine 20 (e.g., a high or low pressure turbine section), and there are a plurality of turbine vanes arranged in a circumferential row in the turbine section 28. Although not shown, the airfoil 62 can additionally include one or more platforms attached with the airfoil section 60. The airfoil section 60 is hollow and defines an internal cavity 61, a leading edge 60*a*, a trailing edge region 63 having a trailing edge 60*b*, a suction side 60*c*, and a pressure side 60*d*. The trailing edge region 63 generally refers to the aft portion of the airfoil section 60 and includes the aft portion of the internal cavity 61 and the trailing edge 60*b*, which is the rear-most edge of the airfoil section 60.

The airfoil section 60 is formed of a ceramic matrix composite (CMC) 64. Referring to the cutaway section in FIG. 2B, the CMC 64 includes ceramic fibers 64*a* that are disposed in a ceramic matrix 64*b*. The CMC 64 may be, but is not limited to, a SiC/SiC composite in which SiC fibers are disposed within a SiC matrix. The ceramic fibers 64*a* are provided in fiber plies 66 (e.g., fabrics) that may be woven or braided and may collectively include plies of different fiber weave configurations.

The fiber plies 66 include core fiber plies 68 and skin fiber plies 70. The core fiber plies 68 define a radial tube 72 that circumscribes and immediately borders the internal cavity 61. The skin fiber plies 70 define the exterior profile of the airfoil section 60 and wrap around the core fiber plies 68 from the pressure side 60*d* in the trailing edge region 63, through the leading edge 60*a*, and to the suction side 60*c* in the trailing edge region 63. In the illustrated example, there are four core fiber plies 68 and three skin fiber plies 70, although it is to be understood that the numbers of plies 68/70 could be varied.

The radial tube 72 has a radiused end 74 in the trailing edge region 63. Except for the inner-most one of the core fiber plies 68, all of the core fiber plies 68 wrap completely around the internal cavity 61. The inner-most one of the core fiber plies 68 terminates short of the radiused end 74, as the small radius may exceed the capability of the ply to bend without fiber tow distress.

There is a filler element 76 in the trailing edge region 63, aft of the internal cavity 61. A filler element in general is often colloquially referred to as a "noodle" and serves as a non-structural space-filler, usually in an interstice where other fiber plies bend. Here, the filler element 76 fills in the region aft of the radiused end 74 and is sandwiched between the skin fiber plies 70 on the pressure side 60*d* and the skin fiber plies 70 on the suction side 60*c*. The filler element 76 may be formed of, but is not limited to, a bundle of densified ceramic fibers (a CMC) or a monolithic ceramic.

Figure 3:
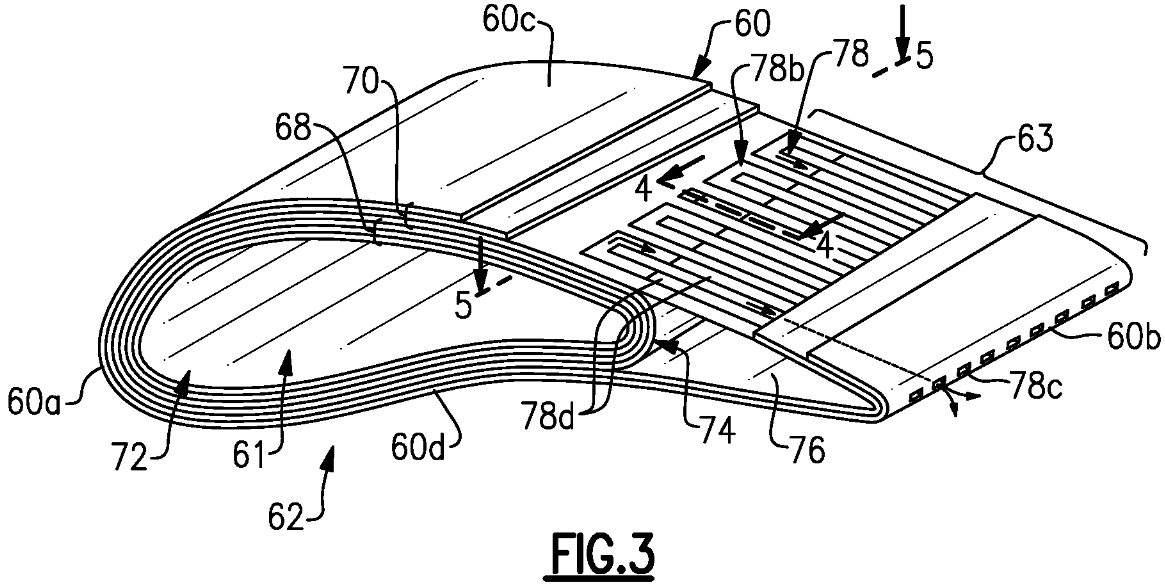
FIG. 3 illustrates the airfoil section with a cutaway portion to reveal a cooling passage.
Figure 4:
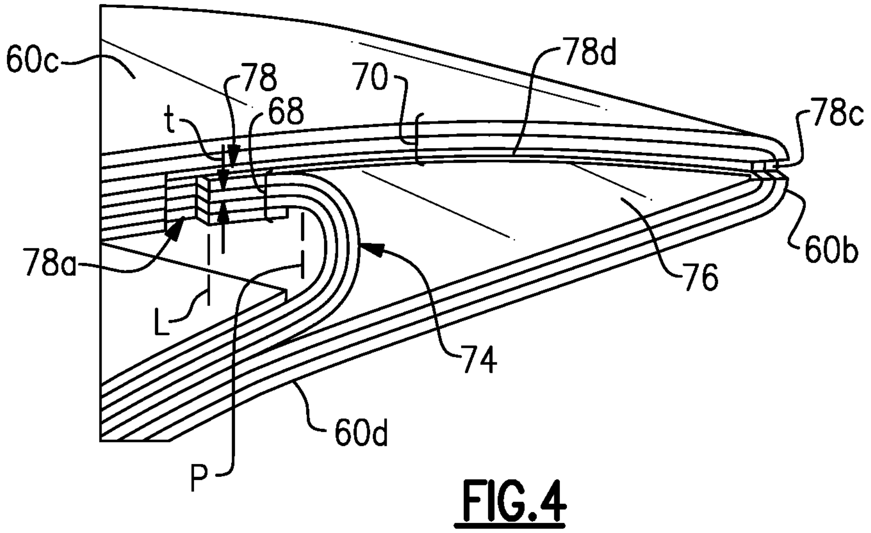
FIG. 4 illustrates a sectioned view through a portion of the cooling passage.
Figure 5:
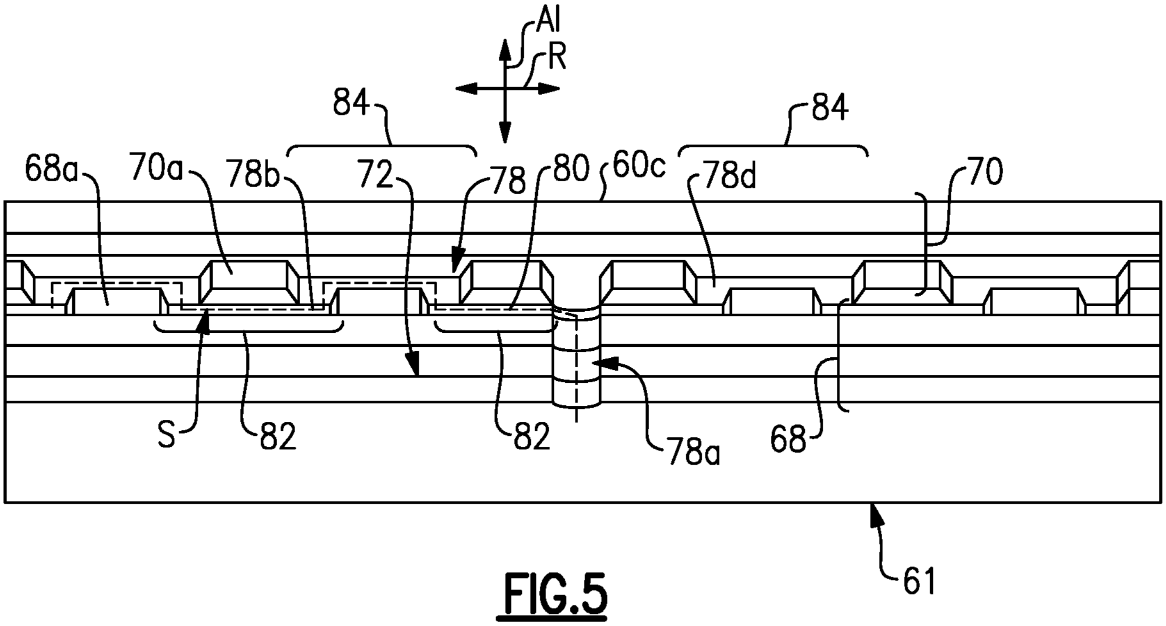
FIG. 5 illustrates a sectioned view taken radially through the plenum of the cooling passage.
Figure 6:
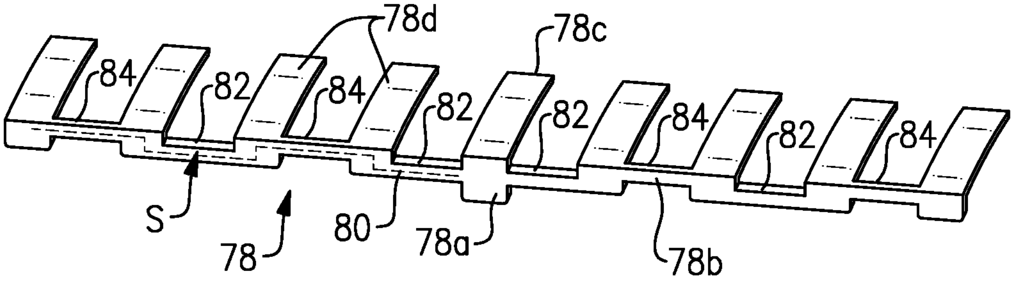
FIG. 6 illustrates a solid volume model view of the cooling passage.

The sides 60*c*/60*d* and the trailing edge region 63 may require cooling. In that regard, as shown in FIG. 3, the airfoil section 60 includes at least one cooling passage 78, with inlet 78*a* (FIG. 2B), for a flow of cooling air. FIG. 3 illustrates a cutaway view showing portions of the cooling passage 78. For example, the cooling air is bleed air from the compressor section 24 that is provided into the internal cavity 61 and flows from the internal cavity 61 into the cooling passage(s) 78. FIGS. 4 and 5 show sectioned views through portions of the cooling passage 78, and FIG. 6 illustrates an isolated view of the cooling passage 78 as a solid volume. The cooling passage 78 is made up of several sections, including at least one inlet orifice section 78*a* that opens to the internal cavity 61 and extends through the core fiber plies 68, a radially-elongated multi-dimensional plenum 78*b* connected with the inlet orifice section 78*a*, a plurality of outlet orifice sections 78*c* that extend through the trailing edge 60*b*, and a plurality of intermediate passage sections 78*d*. In the illustrated example, the cooling passage 78 has a single inlet section 78*a* and multiple outlet orifice sections 78*c*. Alternatively, there may be additional inlet sections 78*a*, but the number of inlet sections 78*a* need not be equal to the number of outlet orifice sections 78*c*. The inlet orifice section 78*a* extends toward the suction side 60*c* such that the intermediate passage sections 78*d* run along the suction side 60*c*. Alternatively, the inlet orifice section 78*a* extends toward the pressure side 60*d* such that the intermediate passage sections 78*d* run along the pressure side 60*d*. In a further example, there is an inlet orifice section 78*a* that extends toward the suction side 60*c* such that intermediate passage sections 78*d* run along the suction side 60*c*, and there is also an inlet orifice section 78*a* that extends toward the pressure side 60*d* such that there are intermediate passage sections 78*d* that run along the pressure side 60*d*.

The inlet section 78*a* opens to the internal cavity 61 and serves for entry of the cooling air into the passage 78, and the outlet sections 78*c* extend through the trailing edge 60*b*, such as along a centerline of the trailing edge 60*b*, and serve to discharge spent cooling air to the exterior of the airfoil section 60 (into the core gaspath C). The plenum 78*b* serves to distribute the cooling air to the intermediate passage sections 78*d*, which connect the plenum 78*b* to the outlet orifice sections 78*c*. The plenum 78*b* extends along the outer-most one of the core plies 68 (designated 68*a* in FIG. 5) and the inner-most one of the skin plies 70 (designated 70*a* in FIG. 5), where "inner" and "outer" are relative to the internal cavity 61. The intermediate passage sections 78*d* are bound by at least one of the skin plies 70 and the filler element 76.

As indicated above, the plenum 78*b* is multi-dimensional. As used herein, the term "multi-dimensional" refers to the path (e.g., as represented by a central axis) of plenum 78*b* having portions that extend along the radial direction (relative to engine axis A) and also portions that extend along at least one direction that is orthogonal to the radial direction, such as an axial or chordal direction. In the example illustrated in FIG. 5, the path of the plenum 78*b* is designated at 80. The outer-most core ply 68*a* contains a row of radially-extending channel segments 82 (i.e., slots) and the inner-most skin ply 70*a* contains a row of radially spaced channel segments 84 (slots) that is radially offset from the channel segments 82 such that each one of the channel segments 84 partially overlaps (at its radial ends) two of the channel segments 82 (at their radial ends). The path 80 thus runs alternately through the channel segments 82 and 84 such that the plenum 78*b* has serpentine shape S. That is, the path 80 runs radially (radial direction R, FIG. 5) within the channel segments 82 and 84, and where the segments 82 and 84 overlap, the path 80 turns axially or chordally (FIG. 5, axis A1). The serpentine shape has the effect that the cooling air that enters inlet 78*a* flows in a circuitous path to enhance thermal absorption while also being distributed to the intermediate passage sections 78*d*.

The radiused end 74 of the radial tube 72 is an area that may be under considerable stress in the airfoil section 60.

For example, the core fiber plies 68 are under bending stresses from bending at the radius in the end 74, and dynamic stresses on the airfoil section 60 may concentrate at this area due to the bending. Such stresses on a CMC may tend to cause delamination between fiber plies. In this regard, the proposition of using an orifice in the radiused end is undesirable, as it would cause a discontinuity in the ceramic fibers and thereby potentially weaken the CMC in that area. Rather, in the example shown (see FIG. 4), the inlet section 78*a* of the passage 78 is at a location L that is axially forward of the radiused end 74, so as to circumvent the end 74 and thus avoid inclusion of a discontinuity in the end 74. For example, the radiused end 74 is demarked by a location P, at which the core fiber plies 68 begin to bend, and the location L is forward of location P. In one example, in order to provide a margin from the location P, the location L is positioned based on a number N of the core fiber plies 68 and a ply thickness t of the plies 68. For instance, the location L is forward of location P by a distance (to the closest edge of the inlet section 78*a*) that is greater than the product of N and t. In a further example, in order to ensure an adequate margin from the location P, the distance is a multiple of N, t, and a multiplier X, where X is from five to ten. Although depicted together, it is to be understood that a plenum 78*b* as disclosed could be used without the location L of the inlet orifice section 78*a*, and vice versa, the location L could be used without use of a plenum 78*b*.

In further embodiments, the location L is substantially further forward of location P by a multiple of the distance (the product of N and t). In such examples, the intermediate passage sections 78*d* are longer and thus run over a longer distance along the suction side 60*c* (or pressure side 60*d*), thereby providing additional cooling of the side 60*c* (or 60*d*).

Figure 7A:
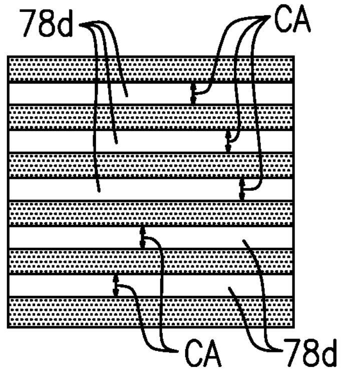
FIG. 7A illustrates straight, uniform cross-section intermediate passage sections of a cooling passage.
Figure 7B:
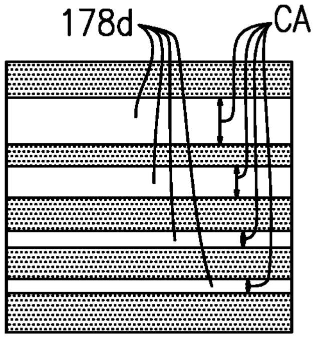
FIG. 7B illustrates straight, unequal cross-section intermediate passage sections of a cooling passage.
Figure 7C:
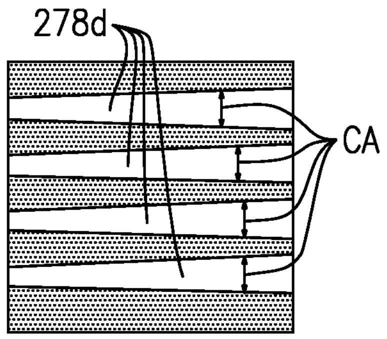
FIG. 7C illustrates straight, divergent cross-section intermediate passage sections of a cooling passage.

FIG. 7A illustrates the intermediate passage sections 78*d*. Each of the intermediate passage sections 78*d* has a cross-sectional area, designated as CA. In this example, the sections 78*d* are straight (axially), the cross-sectional areas CA are constant over the full lengths of the intermediate passage sections 78*d*, and the cross-sectional areas CA are equivalent. Such a configuration provides relatively uniform flow and cooling. FIGS. 7B, 7C, 7D, 7E, and 7F each illustrate additional example configurations of intermediate passage sections. In FIG. 7B, the cross-sectional areas CA are constant over the lengths but are non-equivalent. Such a configuration permits increased flow of the cooling air to some (the larger ones) of the sections 178*d* and thus increased cooling in the vicinity of those sections, while the other (smaller ones) of the sections 178*d* receive less cooling air flow and provide less cooling. In FIG. 7C, the sections 278*d* are divergent such that the respective cross-sectional areas CA increase over their lengths from the plenum 78*b* to the outlet orifice sections 78*c*. Such a configuration diffuses and slows the cooling air flow, allowing for increased thermal pickup.

Figure 7D:
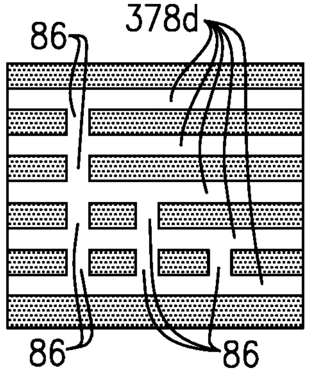
FIG. 7D illustrates straight, uniform cross-section intermediate passage sections of a cooling passage that are branched.
Figure 7E:
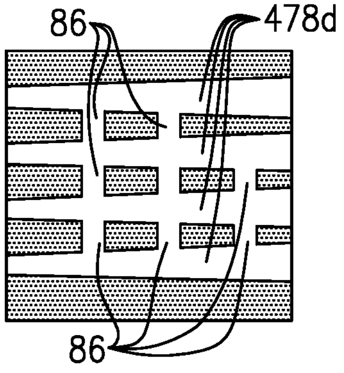
FIG. 7E illustrates straight, divergent cross-section intermediate passage sections of a cooling passage that are branched.
Figure 7F:
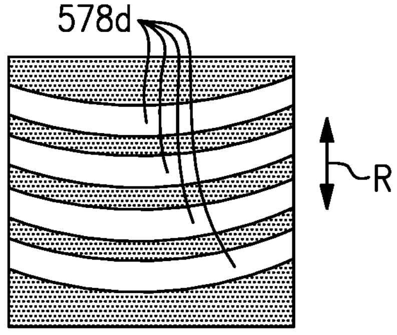
FIG. 7F illustrates radially curved intermediate passage sections of a cooling passage.

In FIG. 7D, the sections 378*d* are the same as the sections 78*d* (straight, constant uniform cross-sections) except that there are branch passage sections 86 that interconnect the sections 378*d*. The branch passage sections 86 extend laterally to the length of the sections 378*d*, which in the airfoil section 60 is radially. Such a configuration permits increased flow of the cooling air to some of the sections 378*d* and thus increased cooling in the vicinity of those sections, while other the sections 378*d* receive less cooling air flow and provide less cooling. In FIG. 7E, the sections 478*d* are similar to those of FIG. 7C but also include branch passage sections 86 as in FIG. 7D. In FIG. 7F, the sections 578*d* are radially curved. Such a configuration provides distributed cooling to, for example, match a thermal profile or thermal gradient. As will be appreciated, in a further example, the sections 578*d* may include branch passage sections 86 as in the prior examples.

Figure 8:
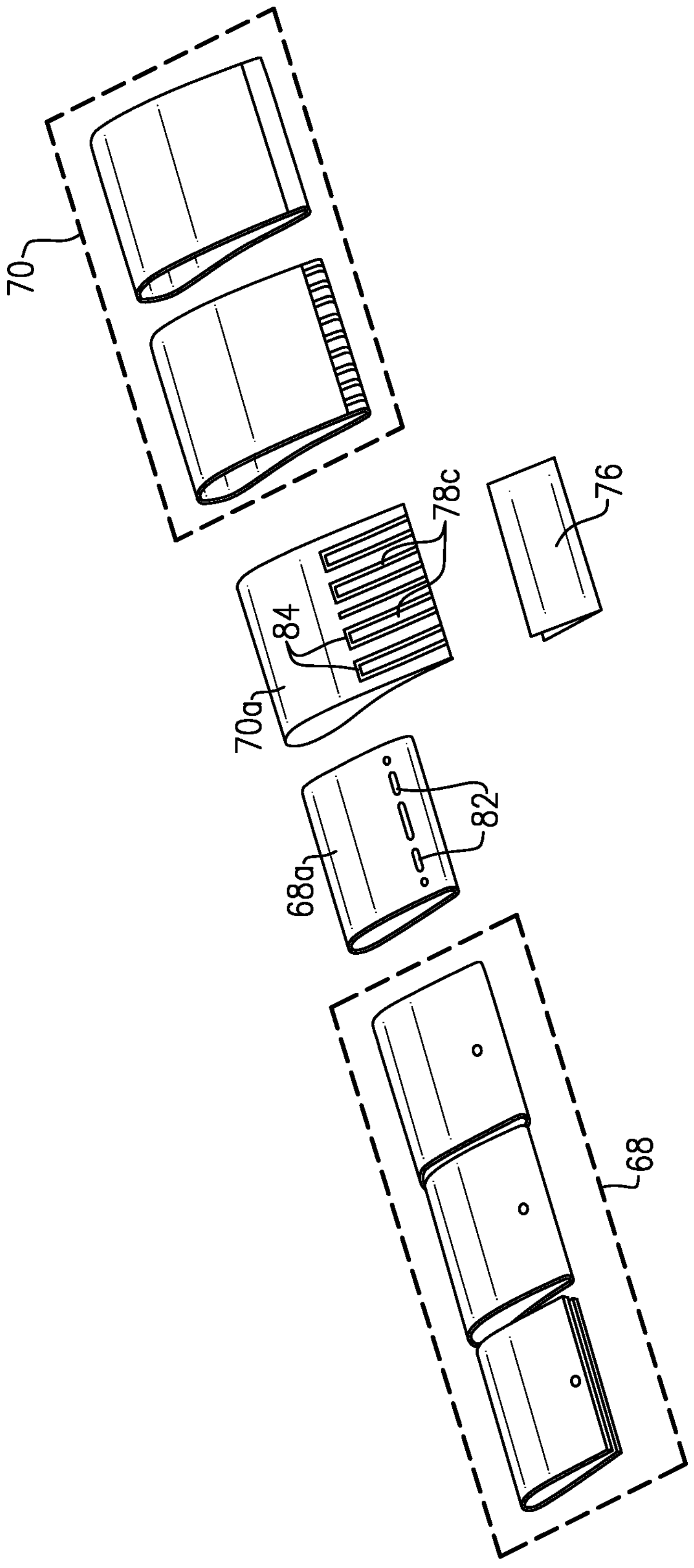
FIG. 8 depicts a method of fabricating an airfoil section.

FIG. 8 depicts a method for fabricating the airfoil section 60, which is generally a fiber ply lay-up process. Unless otherwise specified, the fiber plies that are laid-up are initially devoid of any ceramic matrix material. Core fiber plies 68 are identified on the left side of the figure. These core fiber plies 68 are first laid-up to form what will be the radial tube 72 that circumscribes the internal cavity 61. As an example, the core fiber plies 68 are sequentially laid-up on a mandrel or other support surface. After lay-up of the initial, inner-most core fiber ply 68, the next core fiber plies 68 are wrapped around the initial core fiber ply 68. The core fiber plies 68 are then partially densified with ceramic matrix material, after which an additional, outer-most core fiber ply 68*a* is laid-up around the partially densified core fiber plies 68, to form a core preform. The outer-most core fiber ply 68*a* includes pre-formed slots that will provide the aforementioned channel segments 82. The filler element 76 is then arranged aft of the internal cavity 6 of the core preform. The inner-most skin fiber ply 70*a* is then laid-up to wrap around the core preform and the filer element 76, to form a first intermediate preform. The first intermediate preform is then at least partially densified with additional ceramic matrix material. Slots are then formed in the inner-most skin fiber ply 70*a* to form what will be the intermediate passage sections 78*d*. The slots of the inner-most skin fiber ply 70*a* partially overlap with the slots in the outer-most core fiber ply 68*a* to provide what will be the radially-elongated multi-dimensional plenum 78*b*. The inlet orifice section 78*a* is then formed, such as by drilling, through the core preform to the internal cavity 61, to produce a second intermediate preform. One or more additional skin fiber plies 70 are then laid-up to wrap around the second intermediate preform to form a final preform, which is then fully densified with additional ceramic matrix material. After this densification step, the outlet orifice sections 78*c* are formed through the trailing edge 60*b*, such as by a machining or drilling process.

A typical lay-up process might involve laying-up all of the fiber plies to form a fiber preform and then fully densifying the fiber preform. In the above method, however, the densifications are staged, to occur prior to all of the fiber plies being laid-up. For example, the ceramic matrix in the above densifications is formed by, but is not limited to, chemical vapor infiltration (CVI), melt infiltration (MI), a hybrid of CVI and MI, and/or polymer infiltration and pyrolysis (PIP). The disclosed methodology enables at least the intermediate passage sections 78*d*, inlet orifice section 78*a*, and outlet orifice section 78*c* to be formed after one or more densification steps. While machining and/or drilling is involved and may be somewhat time-consuming, forming these sections of the cooling passage 78 after densification permits precise control over the location and geometry of the passage sections.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil of a gas turbine engine comprising:
an airfoil section defining pressure and suction sides, a leading edge, and a trailing edge region including a trailing edge, the airfoil section being formed of a ceramic matrix composite that includes fiber plies disposed in a ceramic matrix, the fiber plies including:
core fiber plies defining a radial tube that circumscribes an internal cavity, and
skin fiber plies defining an exterior of the airfoil section and wrapping around the core fiber plies from the pressure side, through the leading edge, and to the suction side;
a filler element in the trailing edge region adjacent to the internal cavity and sandwiched between the skin fiber plies on the pressure side and the skin fiber plies on the suction side; and
at least one cooling passage including:
at least one inlet orifice section opening to the internal cavity and extending through the core fiber plies,
a radially-elongated multi-dimensional plenum connected with the at least one inlet orifice section having a path that runs alternatively through an outer-most core ply of the core fiber plies and an inner-most skin ply of the skin fiber plies,
a plurality of outlet orifice sections extending through the trailing edge, and
a plurality of intermediate passage sections bounded by the filler element and connecting the radially-elongated multi-dimensional plenum with the plurality of outlet orifice sections.

2. The airfoil as recited in claim 1, wherein the radially elongated multi-dimensional plenum has a serpentine shape.

3. The airfoil as recited in claim 2, wherein the serpentine shape is provided by a first row of radially-spaced channel segments in the outer-most core ply and a second row of radially-spaced channel segments in the inner-most core ply that is radially offset from the first row such that each one of the radially-spaced channel segments of the second row partially overlaps two of the radially-spaced channel segments of the first row.

4. The airfoil as recited in claim 1, wherein each of the intermediate passage sections has a constant cross-sectional area.

5. The airfoil as recited in claim 1, wherein each of the intermediate passage sections is divergent.

6. The airfoil as recited in claim 1, further including branch passage sections that interconnect the intermediate passage sections.

7. The airfoil as recited in claim 1, wherein the intermediate passage sections are radially curved.

8. The airfoil as recited in claim 1, wherein the radial tube has a radiused end in the trailing edge region, and the at least one inlet orifice section opens to the internal cavity at a location forward of the radiused end.

9. A gas turbine engine comprising:
a compressor section;
a combustor in fluid communication with the compressor section; and
a turbine section in fluid communication with the combustor, the turbine section having airfoils each airfoil including:
an airfoil section defining pressure and suction sides, a leading edge, and a trailing edge region including a trailing edge, the airfoil section being formed of a ceramic matrix composite that includes fiber plies disposed in a ceramic matrix, the fiber plies including:
core fiber plies defining a radial tube that circumscribes an internal cavity, and
skin fiber plies defining an exterior of the airfoil section and wrapping around the core fiber plies from the pressure side, through the leading edge, and to the suction side;
a filler element in the trailing edge region adjacent to the internal cavity and sandwiched between the skin fiber plies on the pressure side and the skin fiber plies on the suction side; and
at least one cooling passage including:
at least one inlet orifice section opening to the internal cavity and extending through the core fiber plies,
a radially-elongated multi-dimensional plenum connected with the at least one inlet orifice section having a path that runs alternatively through an outer-most core ply of the core fiber plies and an inner-most skin ply of the skin fiber plies,
a plurality of outlet orifice sections extending through the trailing edge, and
a plurality of intermediate passage sections bounded by the filler element and connecting the radially-elongated multi-dimensional plenum with the plurality of outlet orifice sections.

10. The gas turbine engine as recited in claim 9, wherein the radially elongated multi-dimensional plenum has a serpentine shape.

11. The airfoil as recited in claim 10, wherein the serpentine shape is provided by a first row of radially-spaced channel segments in the outer-most core ply and a second row of radially-spaced channel segments in the inner-most core ply that is radially offset from the first row such that each one of the radially-spaced channel segments of the second row partially overlaps two of the radially-spaced channel segments of the first row.

12. A method of fabricating an airfoil of a gas turbine that has an airfoil section defining pressure and suction sides, a leading edge, and a trailing edge region including a trailing edge, the method comprising:
laying-up first core fiber plies to form a radial tube that circumscribes an internal cavity;
partially densifying the first core fiber plies with ceramic matrix material to form partially densified first core fiber plies;
laying-up an additional core fiber ply around the partially densified first core fiber plies to form a core preform, wherein the additional core fiber ply includes preformed slots;
arranging a filler element adjacent to the internal cavity of the core preform;
laying-up a first skin fiber ply around the core preform and the filer element to form a first intermediate preform;
at least partially densifying the first intermediate preform with additional ceramic matrix material to form partially densified first skin fiber ply;
in the at least partially densified first skin fiber ply, forming intermediate passage sections, wherein the intermediate passage sections partially overlap with the preformed slots to provide a radially-elongated multi-dimensional plenum;

forming at least one inlet orifice section through the core preform to the internal cavity to provide a second intermediate preform;

laying-up one or more additional skin fiber plies around the second intermediate preform to form a final preform;

densifying the final preform with additional ceramic matrix material; and forming a plurality of outlet orifice sections that extend through the trailing edge, the at least one inlet orifice section, the radially-elongated multi-dimensional plenum, the intermediate passage sections, and the plurality of outlet orifice sections being connected to provide at least one cooling passage.

* * * * *